US010249864B2

(12) United States Patent
Yamanaka (10) Patent No.: US 10,249,864 B2
(45) Date of Patent: Apr. 2, 2019

(54) BATTERY PACK

(71) Applicant: TOYOTA JIDOSHA KABUSHIKI KAISHA, Toyota-shi, Aichi-ken (JP)

(72) Inventor: Atsushi Yamanaka, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 56 days.

(21) Appl. No.: 15/395,688

(22) Filed: Dec. 30, 2016

(65) Prior Publication Data
US 2017/0200934 A1    Jul. 13, 2017

(30) Foreign Application Priority Data
Jan. 12, 2016    (JP) ................ 2016-003747

(51) Int. Cl.
*H01M 2/18*    (2006.01)
*H01M 2/10*    (2006.01)
*H01M 2/02*    (2006.01)
*H01M 10/04*   (2006.01)

(52) U.S. Cl.
CPC ........... *H01M 2/18* (2013.01); *H01M 2/0237* (2013.01); *H01M 2/1077* (2013.01); *H01M 10/0481* (2013.01); *H01M 2220/20* (2013.01)

(58) Field of Classification Search
CPC .... H01M 2/18; H01M 2/1077; H01M 2/0237; H01M 2220/20; H01M 10/0481
See application file for complete search history.

(56) References Cited

U.S. PATENT DOCUMENTS

2005/0287426 A1* 12/2005 Kim ................. B60L 11/1874
                                                              429/149
2011/0293982 A1* 12/2011 Martz .............. H01M 10/6551
                                                              429/120

FOREIGN PATENT DOCUMENTS

JP    2001-23702 A    1/2001
JP    2012-059380 A   3/2012

* cited by examiner

*Primary Examiner* — Osei K Amponsah
(74) *Attorney, Agent, or Firm* — Sughrue Mion, PLLC (57) ABSTRACT

A spacer includes: a first projection being in contact with the battery cell; a second projection being in contact with the battery cell; a third projection adjacent to the first projection, and being in contact with the battery cell; a first inclined portion connecting the first projection and the third projection; a fourth projection adjacent to the second projection, and being in contact with the battery cell; a second inclined portion connecting the second projection and the fourth projection; and a fifth projection and a sixth projection being out of contact with the battery cells between the third projection and the fourth projection. When the battery cells expand, the fifth and the sixth projections come into contact with the battery cells.

3 Claims, 5 Drawing Sheets

BATTERY PACK

INCORPORATION BY REFERENCE

The disclosure of Japanese Patent Application No. 2016-003747 filed on Jan. 12, 2016 including the specification, drawings and abstract is incorporated herein by reference in its entirety.

BACKGROUND

1. Technical Field

This embodiment relates to a battery pack.

2. Description of Related Art

With respect to conventional battery packs, for example, Japanese Patent Application Publication No. 2012-59380 discloses a fuel cell stack made for the purpose of reduction in dimension, and designing flowing layers through which a power-generation gas flows and cooling layers through which a coolant flows to be independent from each other so as to reduce a height of each layer of the flowing layers and the cooling layers (JP 2012-59380 A). The fuel cell stack disclosed in JP 2012-59380 A includes each pair of separators sectioning the cooling layers used for flowing the coolant through unit cells, and each electrically-conductive deformation-absorbing member that is in conductive contact with these separators, and also absorbs deformation by expansion of the unit cells.

SUMMARY

As disclosed in the Japanese Patent Application Publication No. 2012-59380, there has been known a battery pack including flexible spacers each of which is interposed between each two of stacked battery cells. In such a battery pack, it is required to apply a predetermined load or more that is necessary to integrally bundle the multiple battery cells from the spacers to the battery cells.

Meanwhile, in the above battery pack, an expansion-contraction movement among the battery cells is generated due to variation of SOC (state of charge) during charging and discharging or variation in temperature. The spacers have another function to absorb this expansion-contraction movement among the battery cells. However, in accordance with increase in amount of expansion among the battery cells, load applied from the spacers to the battery cells becomes partially increased. In such a case, variation in internal resistance occurs among the battery cells, which might hinder an appropriate battery performance.

The present embodiment provides a battery pack capable of securing an appropriate battery performance even when the battery cells expand or a predetermined load or more is applied from spacers to battery cells.

A battery pack in an aspect of this embodiment includes: first battery cell; second battery cell stacked relative to the first battery cells; and spacer having a wavy cross-sectional shape configured of projecting shapes that project toward each first battery cell and each second battery cell alternately, and is interposed between the first battery cell and the second battery cell. The spacer includes: a first projection configured to project toward the first battery cell, and be in contact with the first battery cell; a second projection being disposed at a position apart from the first projection, being configured to project toward the second battery cell, and being configured to be in contact with the second battery cell; a third projection that is adjacent to the first projection among a plurality of the projecting shapes included in the spacer, is disposed between the first projection and the second projection, is configured to project toward the second battery cell, and is configured to be in contact with the second battery cell; a first inclined portion configured to extend in an oblique direction relative to a stacking direction of the first battery cell and the second battery cell, the first inclined portion being configured to connect the first projection and the third projection; a fourth projection that is adjacent to the second projection among the plurality of the projecting shapes included in the spacer, is disposed between the first projection and the second projection, is configured to project toward the first battery cell, and is in contact with the first battery cell; a second inclined portion configured to extend in an oblique direction relative to the stacking direction of the first battery cell and the second battery cell, the second inclined portion being configured to connect the second projection and the fourth projection; and a fifth projection and a sixth projection each of which is disposed between the third projection and the fourth projection, the fifth projection and the sixth projection being configured to project toward the first battery cell and the second battery cell, respectively, and being configured to be disposed out of contact with the first battery cell and the second battery cell. When the first battery cell and the second battery cell expand, the fifth projection and the sixth projection come into contact with the first battery cell and the second battery cell, respectively.

According to the above-configured battery pack, each first inclined portion is brought to generate a force in a direction to cause buckling between each first projection and each third projection; and each second inclined portion is brought to generate a force in a direction to cause buckling between each second projection and each fourth projection, thereby applying a predetermined load or more from the spacer to the first battery cell and the second battery cell. When the first battery cells and the second battery cells expand, it is possible to increase the contact points between the spacer, and the first battery cells and the second battery cells, thereby distributing load applied from the spacer to the first battery cells and the second battery cells. Through this, it is possible to realize the battery pack capable of securing an appropriate battery performance even when the battery cells expand.

The aspect of the present embodiment may be configured as below. The first inclined portion linearly extends between the first projection and the third projection. The second inclined portion linearly extends between the second projection and the fourth projection.

According to the above-configured battery pack, a force applied from the first battery cell to the first projection can more efficiently be converted into a force acting in a direction from the third projection toward the fourth projection, and a force applied from the second battery cell to the second projections can more efficiently be converted into a force acting in a direction from the fourth projection toward the third projection.

The aspect of the present embodiment may be configured as below. A contact area between the first projection and the first battery cell is larger than a contact area between the third projection and the second battery cell. A contact area between the second projection and the second battery cell is larger than a contact area between the fourth projection and the first battery cell.

According to the above-configured battery pack, predictivity of the deformation of the spacer becomes increased, thereby flexibly controlling the contact points between the spacer, and the first battery cell and the second battery cell.

The aspect of the present embodiment may be configured as below. The spacer includes a plurality of sets of the first projection, the second projection, the third projection, the fourth projection, the fifth projection, the sixth projection, the first inclined portion and the second inclined portion.

According to the above-configured battery pack, it is possible to exert any one of the aforementioned advantageous effects in a wider range between the spacer, and the first battery cell and the second battery cell.

As aforementioned, according to this embodiment, it is possible to provide a battery pack capable of securing an appropriate battery performance even when the battery cells expand or a predetermined load or more is applied from spacers to battery cells.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

An embodiment will be described with reference to drawings. The same or equivalent components in the drawings referred to below are denoted with the same reference numerals.

Figure 1:
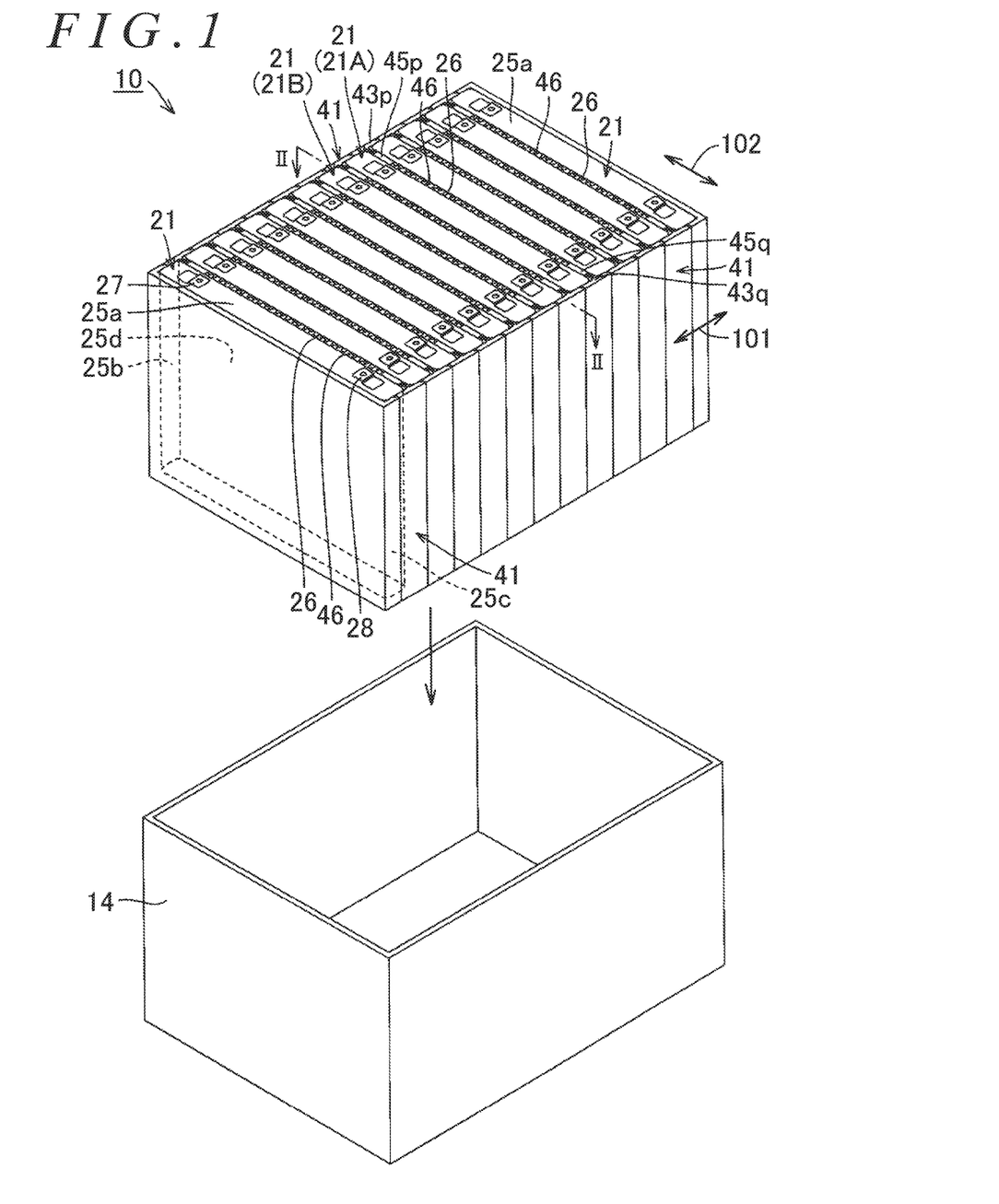
FIG. 1 is an exploded view showing a battery pack in an embodiment.
Figure 2:
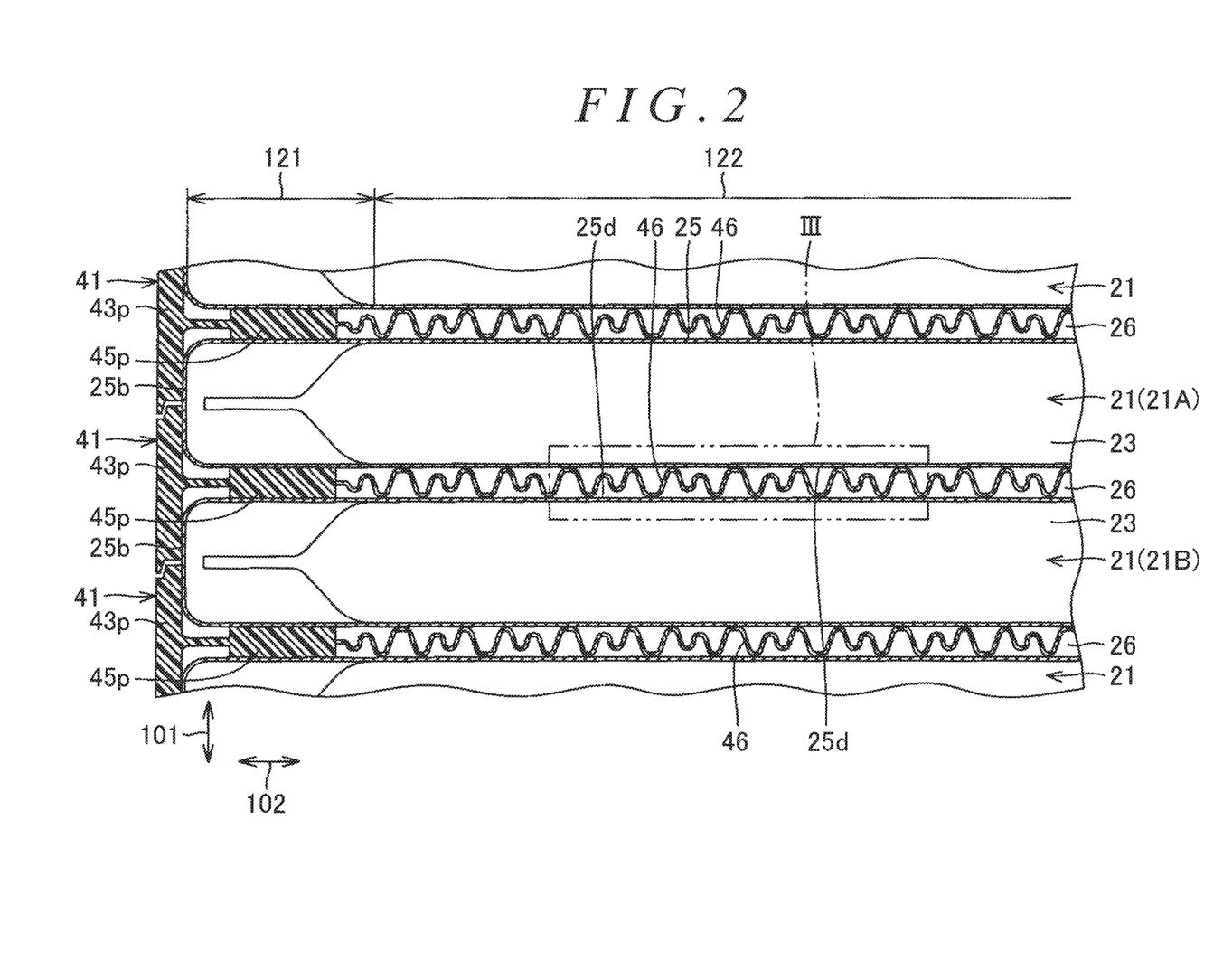
FIG. 2 is a cross-sectional view partially showing the battery pack taken along line II-II in FIG. 1.

FIG. 1 is an exploded view showing a battery pack in an embodiment. FIG. 2 is a cross-sectional view partially showing the battery pack taken along line II-II in FIG. 1. With reference to FIG. 1 and FIG. 2, the battery pack 10 in the present embodiment is installed in a hybrid vehicle or an electric vehicle that includes an internal combustion engine such as a gasoline engine and a diesel engine, and a motor to which electric power is supplied from a rechargeable battery as a power source thereof.

An overall configuration of the battery pack 10 will be explained hereinafter. The battery pack 10 is a lithium ion battery. The battery pack 10 includes multiple battery cells 21, spacers 41, and a case body 14.

The multiple battery cells 21 are stacked in one direction as indicated by an arrow 101 (hereinafter, the direction as indicated by the arrow 101 is also referred to as a "stacking direction of the battery cells 21"). Each battery cell 21 has a thin platy shape in a substantially rectangular parallelepiped. The multiple battery cells 21 are stacked in such a manner that each side surface 25d having the greatest area among areas of multiple side surfaces of each battery cell 21 faces each other between each two adjacent battery cells 21.

Each battery cell 21 includes an electrode body 23, a cell case 25, a positive electrode terminal 27, and a negative electrode terminal 28.

The cell case 25 has a casing shape in a substantially rectangular parallelepiped, and defines an outer appearance of the battery cell 21. Each cell case 25 is formed of metal such as aluminum. The electrode body 23 is housed together with an electrolytic solution in the cell case 25. The electrode body 23 is configured of a positive electrode sheet and a negative electrode sheet overlapping the positive electrode sheet via a separator. The electrode body 23 may be a wound-type one formed by winding a laminated body formed of a positive electrode sheet, a separator and a negative electrode sheet, or may be a stack-type one formed by repetitively stacking positive electrode sheets, separators and negative electrode sheets.

The positive electrode terminal 27 and the negative electrode terminal 28 are fixed to a top surface 25a of the cell case 25. The positive electrode terminal 27 and the negative electrode terminal 28 are electrically connected to the electrode body 23 inside the cell case 25. The positive electrode terminals 27 and the negative electrode terminals 28 are electrically connected in series among the multiple battery cells 21.

The spacer 41 is interposed between each two adjacent battery cells 21. Each spacer 41 is formed of an electrically insulating material. The spacer 41 is formed of resin. The spacer 41 includes, as component elements thereof, a frame portion 43$p$ and a frame portion 43$q$, a platy portion 45$p$ and a platy portion 45$q$, and a wavy portion 46.

The frame portion 43$p$ and the frame portion 43$q$ are so provided as to cover a side surface 25$b$ and a side surface 25$c$ in pair of the cell case 25, respectively. The platy portion 45$p$ is provided to a front end extending from the frame portion 43$p$ toward a space between each two adjacent battery cells 21. The platy portion 45$q$ is provided to a front end extending from the frame portion 43$q$ toward a space between each two adjacent battery cells 21. The platy portion 45$p$ and the platy portion 45$q$ extend in a platy shape between each battery cell 21 (battery cell 21A) and each battery cell 21 (battery cell 21B) adjacent to the former battery cell 21.

The wavy portion 46 is disposed between each platy portion 45$p$ and each platy portion 45$q$. Each wavy portion 46 has a wavy cross-sectional shape. Each wavy portion 46 has a wavy cross-sectional shape formed by repetitively alternating a projecting shape projecting toward the battery cell 21A and a projecting shape projecting toward the battery cell 21B. The wavy portion 46 extends in a wavy shape in a direction orthogonal to the stacking direction of the battery cells 21 (in a direction as indicated by an arrow 102 in FIG. 1 and FIG. 2) as a whole (hereinafter, the direction in which the wavy portion 46 extends in a wavy shape as a whole is also referred to as an "extending direction of the wavy portion 46").

Inside the cell case 25, a space 121 where the electrode body 23 is out of tight contact with an inner surface of the cell case 25, and a space 122 where the electrode body 23 is in tight contact with the inner surface of the cell case 25 are respectively defined. In the stacking direction of the battery cells 21, the platy portion 45$p$ and the platy portion 45$q$ are disposed at respective positions where these portions are projected in the space 121. In the stacking direction of the battery cells 21, the wavy portion 46 is disposed at a position where this portion is projected in the space 122.

A cooling-air flow passage 26 through which a cooling air flows is formed between each two adjacent battery cells 21 by interposing the spacer 41 (wavy portion 46) therebetween. FIG. 2 shows a cross section of the battery pack 10 cut by a plane orthogonal to the flowing direction of the cooling air in the cooling-air flow passage 26. The wavy portion 46 has an identical cross-sectional shape in the flowing direction of the cooling air in the cooling-air flow passage 26.

The case body 14 has a casing shape in a substantially rectangular parallelepiped. The stacked body formed of the multiple battery cells 21 and the spacers 41 each of which is interposed between each two adjacent battery cells 21 are housed in the case body 14. In this configuration, the multiple battery cells 21 are integrally bundled inside the case body 14.

FIG. 2 shows a cross section of the stacked body formed of the multiple battery cells 21 and the spacers 41 in a state of being housed in the case body 14.

Figure 3:
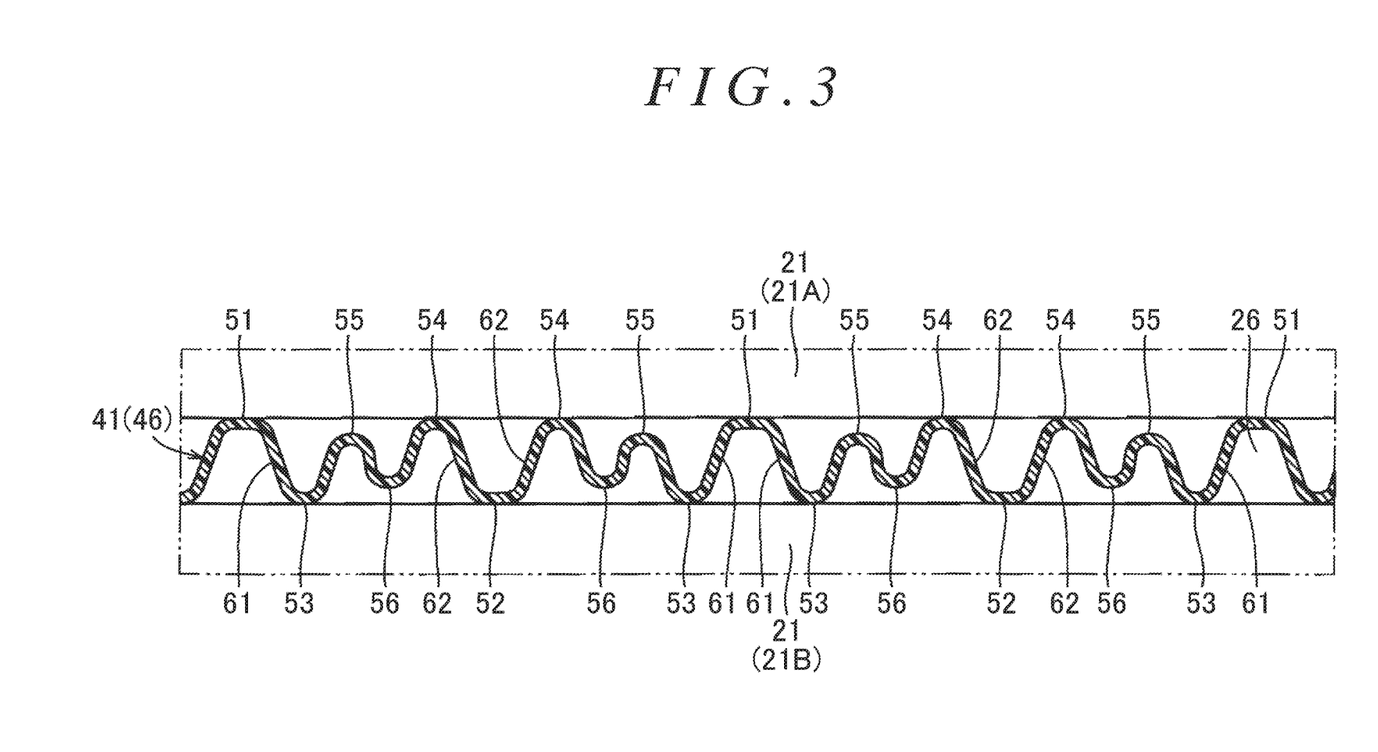
FIG. 3 is an enlarged cross-sectional view showing a spacer in a range surrounded by a two-dot chain line III in FIG. 2.

Subsequently, a shape of the wavy portion 46 of each spacer 41 will be described in details. FIG. 3 shows an enlarged cross-sectional view of the spacer within a range surrounded by a two-dot chain line III in FIG. 2.

With reference to FIG. 3, the spacer 41 (wavy portion 46) includes, as component elements thereof, first projections 51, second projections 52, third projections 53, fourth projections 54, fifth projections 55, sixth projections 56, first inclined portions 61, and second inclined portions 62. Each of the first projections 51 to the sixth projections 56 is formed in a projecting shape projecting toward the battery cell 21A or the battery cell 21B.

The first projections 51 project toward the battery cell 21A. The first projections 51 are in contact with the battery cell 21A. The first projections 51 are in contact with the battery cell 21A at top ends thereof projecting toward the battery cell 21A.

The second projections 52 are disposed at respective positions apart from the first projections 51 in the longitudinally expending direction of the wavy portion 46. The second projections 52 are arranged not to be continuously adjacent to the first projections 51. The second projections 52 project toward the battery cell 21B. The second projections 52 are in contact with the battery cell 21B. The second projections 52 are in contact with the battery cell 21B at top ends thereof projecting toward the battery cell 21B.

Each third projection 53 is disposed between each first projection 51 and each second projection 52. Each third projection 53 is arranged to be continuously adjacent to each first projection 51. Each of the first projections 51 and each of the third projections 53 are adjacently arranged to each other among the multiple projecting shapes included in each spacer 41 (wavy portion 46). The third projections 53 project toward the battery cell 21B. The third projections 53 are in contact with the battery cell 21B. The third projections 53 are in contact with the battery cell 21B at top ends thereof projecting toward the battery cell 21B. The third projections 53 are curved at the top ends thereof projecting toward the battery cell 21B.

Each first inclined portion 61 is disposed in a manner as to connect each first projection 51 and each third projection 53. Each first inclined portion 61 obliquely extends relative to the stacking direction of the battery cells 21. Particularly in the present embodiment, each first inclined portion 61 linearly extends between each first projection 51 and each third projection 53.

Each fourth projection 54 is disposed between each first projection 51 and each second projection 52. Each fourth projection 54 is arranged to be continuously adjacent to each second projection 52. Each of the second projections 52 and each of the fourth projections 54 are adjacently arranged to each other among the multiple projecting shapes included in each spacer 41 (wavy portion 46). The fourth projections 54 project toward the battery cell 21A. The fourth projections 54 are in contact with the battery cell 21A. The fourth projections 54 are in contact with the battery cell 21A at top ends thereof projecting toward the battery cell 21A. The fourth projections 54 are curved at the top ends thereof projecting toward the battery cell 21A.

Each second inclined portion 62 is disposed in a manner as to connect each second projection 52 and each fourth projection 54. Each second inclined portion 62 obliquely extends relative to the stacking direction of the battery cells 21. Particularly in the present embodiment, each second inclined portion 62 linearly extends between each second projection 52 and each fourth projection 54.

Each first inclined portion 61 may obliquely extend relative to the stacking direction of the battery cells 21 in a manner as to be curved between each first projection 51 and each third projection 53. Each second inclined portion 62 may obliquely extends relative to the stacking direction of the battery cells 21 in a manner as to be curved between each second projection 52 and each fourth projection 54.

Each fifth projection 55 is disposed between each third projection 53 and each fourth projection 54. Each fifth projection 55 is arranged to be continuously adjacent to each third projection 53. Each fifth projection 55 is arranged to be continuously adjacent to each sixth projection 56. Each fifth projection 55 is disposed between each third projection 53 and each sixth projection 56. The fifth projections 55 project toward the battery cell 21A. The fifth projections 55 are so provided as to be out of contact with the battery cell 21A. Top ends of the fifth projections 55 projecting toward the battery cell 21A are apart from the battery cell 21A. The fifth projections 55 are curved at the top ends thereof projecting toward the battery cell 21A.

Each sixth projection 56 is disposed between each third projection 53 and each fourth projection 54. Each sixth projection 56 is arranged to be continuously adjacent to each fourth projection 54. Each sixth projection 56 is disposed between each fourth projection 54 and each fifth projection 55. The sixth projections 56 project toward the battery cell 21B. The sixth projections 56 are so provided as to be out of contact with the battery cell 21B. Top ends of the sixth projections 56 projecting toward the battery cell 21B are apart from the battery cell 21B. The sixth projections 56 are curved at the top ends thereof projecting toward the battery cell 21B.

A contact area between each first projection 51 and the battery cell 21A is greater than a contact area between each third projection 53 and the battery cell 21B. A contact area between each second projection 52 and the battery cell 21B is greater than a contact area between each fourth projection 54 and the battery cell 21A.

A distance of a gap between each fifth projection 55 and the battery cell 21A may be the same as or different from a distance of a gap between each sixth projection 56 and the battery cell 21B.

The spacer 41 (wavy portion 46) includes multiple sets of first projections 51 to sixth projections 56 and first inclined portions 61 to second inclined portions 62. More specifically, the third projections 53 are disposed to both sides of each first projection 51 via the respective first inclined portions 61; and the fourth projections 54 are disposed to both sides of each second projection 52 via the respective second inclined portions 62. Each fifth projection 55 and each sixth projection 56 are disposed between each third projection 53 and each fourth projection 54. A wavy shape of the wavy portion 46 is symmetric in the longitudinally extending direction of the wavy portion 46 relative to a contact point between each first projection 51 and the battery cell 21A or relative to a contact point between each second projection 52 and the battery cell 21B.

Figure 4:
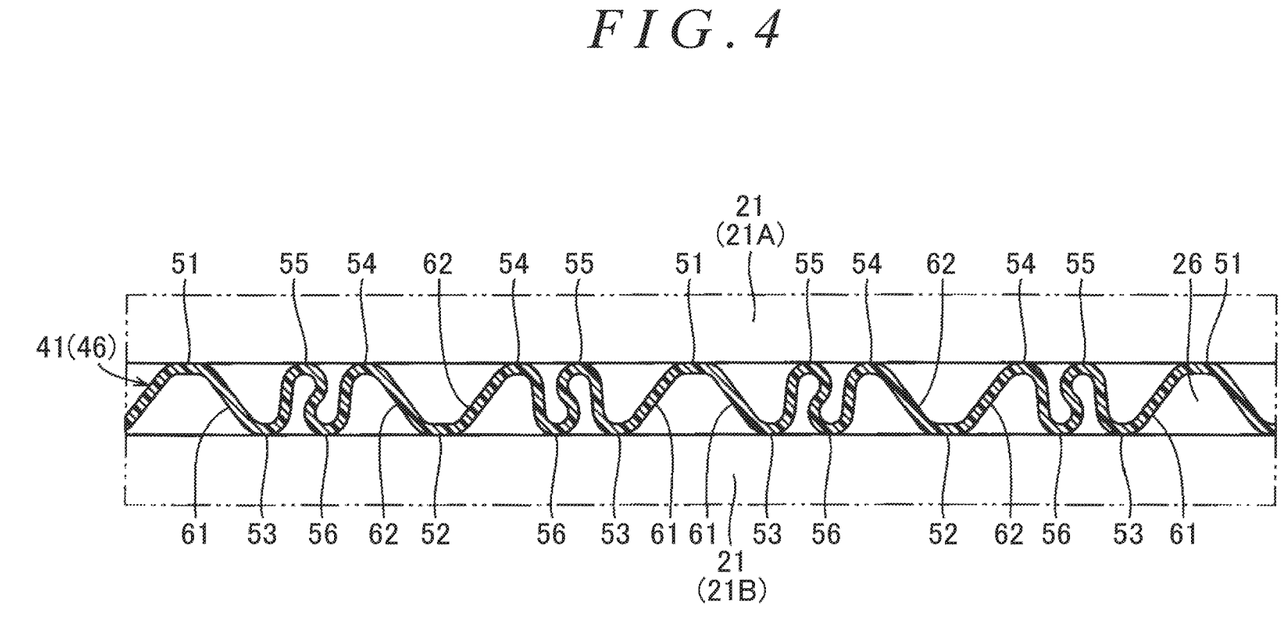
FIG. 4 is a cross-sectional view showing the spacer when battery cells expand.

FIG. 4 is a cross-sectional view showing the spacer when the battery cells expand. With reference to FIG. 4, when the battery cells 21 expand, a distance between the battery cell 21A and the battery cell 21B becomes shorter, so that the spacer 41 becomes deformed. At this time, the fifth projections 55 come into contact with the battery cell 21A, and the sixth projections 56 come into contact with the battery cell 21B.

Figure 5:
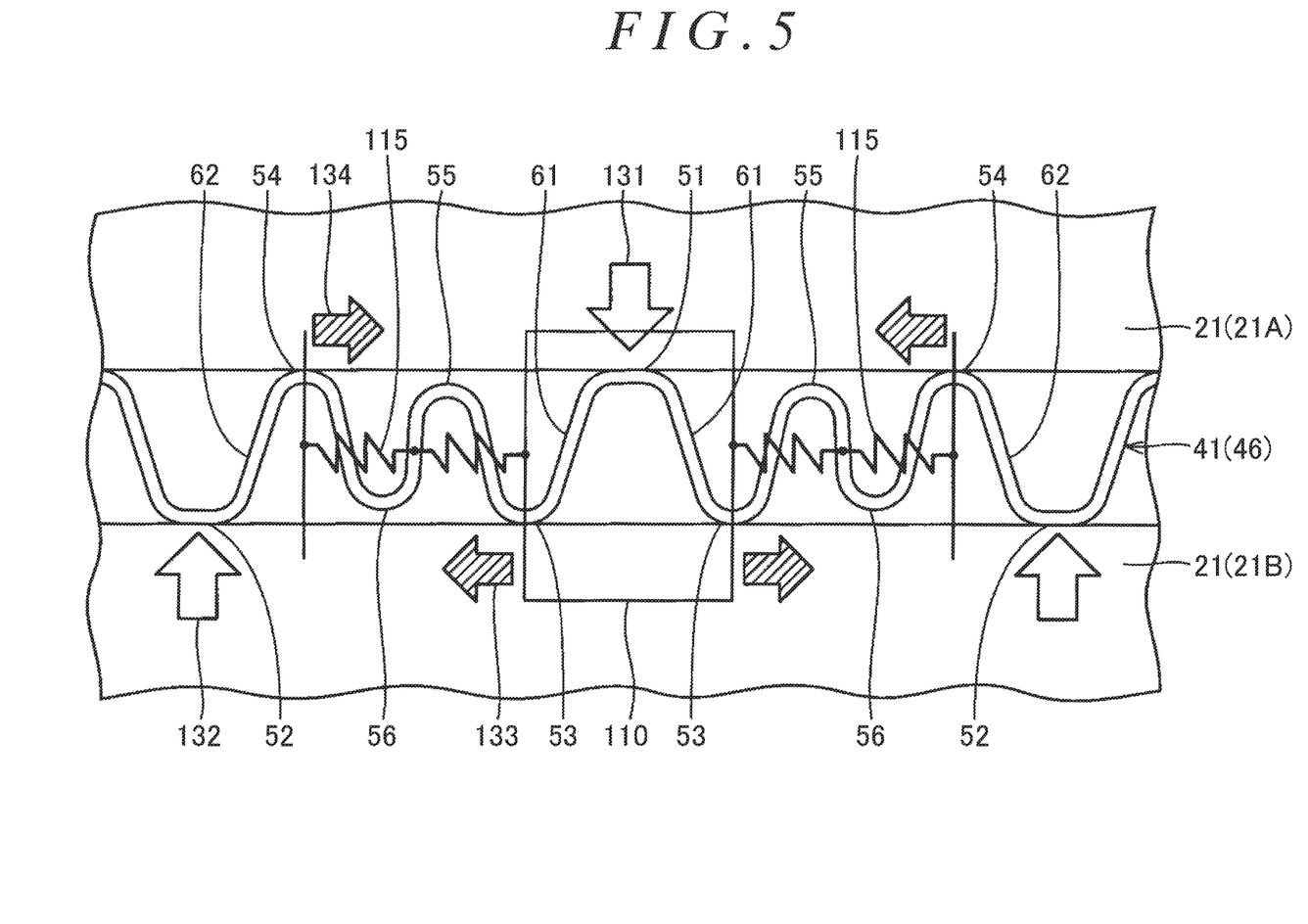
FIG. 5 is a cross-sectional view explaining operational effects exerted by the battery pack in FIG. 1.

FIG. 5 is a cross-sectional view explaining operational effects exerted by the battery pack in FIG. 1. Subsequently, the operational effects exerted by the battery pack 10 in FIG. 1 will be described.

With reference to FIG. 3 to FIG. 5, there are variations in thickness among the battery cells 21 because of a tolerance with respect to manufacturing. As one of functions of the spacer 41, the spacer 41 absorbs a tolerance of thickness among the battery cells 21 so as to bundle the multiple battery cells 21 in a constant length in the stacking direction of the multiple battery cells 21 (standard-size bundling). An expansion-contraction movement of the battery cells 21 is generated due to variation of SOC (state of charge) at the recharging time and variation in temperature. As another function of the spacer 41, the spacer 41 absorbs variation in dimension at the expansion-contraction time of the battery cells 21.

Meanwhile, in order to maintain the battery performance, there is set an upper limit value of a load to be applied from each spacer 41 to the battery cells 21. In the aforementioned standard-size bundling, in order to realize reduction in size of the battery pack 10, it is required to reduce a load rate of the spacer 41 (reduction in load rate). On the other hand, in order to integrally bundle the multiple battery cells 21, it is required to apply a predetermined load or more from each spacer 41 to the battery cells 21. In accordance with increase in expansion of the battery cells 21, load applied from each spacer 41 to the battery cells 21 becomes partially increased. In this case, a distance between each positive electrode and each negative electrode becomes ununiform, which becomes a factor that causes variation in internal resistance. Consequently, when the battery cells 21 expand, it is required to distribute the load applied from each spacer 41 to the battery cells 21.

To cope with this, in the battery pack 10 of the present embodiment, a load converting mechanism 110 is used to convert a direction of a force applied from the battery cells 21 to each spacer 41 so as to elastically deform each spring portion 115, thereby realizing reduction in load rate of each spacer 41.

More specifically, in each spacer 41, the load converting mechanism 110 is configured by the first projections 51, the first inclined portions 61, and the third projections 53; and similarly, the load converting mechanism 110 is configured by the second projections 52, the second inclined portions 62, and the fourth projections 54. The spring portions 115 are configured by the fifth projections 55 and the sixth projections 56.

In such a configuration, a force in the stacking direction of the battery cells 21 (force as indicated by an arrow 131 in FIG. 5) is applied from the battery cell 21A to the first projections 51; and a force in the stacking direction of the battery cells 21, which is an opposite direction to the direction of the force applied from the battery cell 21A to the first projections 51 (force as indicated by arrows 132 in FIG. 5) is applied from the battery cell 21B to the second projections 52.

At this time, at each first inclined portion 61, a stress in a direction to cause buckling between each first projection 51 and each third projection 53 is generated, and thus part of the force applied to each first projection 51 is converted at each first inclined portion 61 into a force acting in a direction from each third projection 53 toward each fourth projection 54 (force as indicated by arrows 133 in FIG. 5). At each second inclined portions 62, a stress in a direction to cause buckling between each second projection 52 and each fourth projection 54 is generated, and thus part of the force applied to each second projection 52 is converted at each second inclined portion 62 into a force acting in a direction from each fourth projection 54 toward each third projection 53 (force as indicated by arrows 134 in FIG. 5).

Each third projection 53 is displaced in a direction toward each fourth projection 54 while resisting an friction force between the third projection 53 and the battery cell 21B; and each fourth projection 54 is displaced in a direction toward each third projection 53 while resisting an friction force between the fourth projection 54 and the battery cell 21A. In accordance with the displacements of the fourth projections 54 and the third projections 53, the fifth projections 55 and the sixth projections 56 are elastically deformed. Through this, part of the force applied from the battery cells 21 to the spacer 41 is absorbed, thereby realizing reduction in load rate of the spacer 41. Each first inclined portion 61 is brought to generate a force in a direction to cause buckling between each first projection 51 and each third projection 53; and each second inclined portion 62 is brought to generate a force in a direction to cause buckling between each second projection 52 and each fourth projection 54, thereby applying a predetermined load or more necessary to integrally bundle the multiple battery cells 21 from the spacer 41 to the battery cell 21A and the battery cell 21B.

The spring portions 115 are elastically deformable by the force in the longitudinally extending direction of the wavy portion 46 received from the load converting mechanism 110. The spacer 41 includes the fifth projections 55 and the sixth projections 56 as the smallest component elements configuring the spring portions 115.

This means that projections that are disposed between each third projection 53 and each fourth projection 54 are not limited to the two projections of the fifth projection 55 and the sixth projection 56, and more projections may also be disposed therebetween. In this case, there may be provided projections having different heights from each other. The spring portion 115 may not always be configured by only multiple projections that project toward the battery cells 21. For example, each two adjacent projections may be connected to each other by a portion extending in the longitudinally extending direction of the wavy portion 46.

Herein, it is assumed that all the projections between the respective first projections 51 and the respective second projections 52 (i.e., the third projections 53 to the sixth projections 56 of the spacer 41 in FIG. 5) are arranged in a manner as to be out of contact with the battery cells 21, even when an input of a force from the battery cells 21 to the first projections 51 and the second projections 52 is received, it is impossible to generate a stress in a direction to cause buckling between each first inclined portion 61 and each second inclined portion 62. Consequently, the wavy portion 46 is deformed in a manner as to extend in the longitudinally extending direction of the wavy portion 46. In this case, in the spacer 41, there are caused problems that a sufficient reaction force necessary to integrally bundle the multiple battery cells 21 cannot be obtained, or it is impossible to appropriately control the contact points between the battery cells 21 and the spacer 41.

In the present embodiment, the direction of the force inputted into the spacer 41 is converted at the first inclined portions 61 and the second inclined portions 62 that have a relatively higher rigidity, and this force is received by the fifth projections 55 and the sixth projections 56 that have a relatively smaller rigidity, thereby realizing reduction in load rate of the spacer 41. From the above point of view, through the configuration in which each first inclined portion 61 linearly extends between each first projection 51 and each third projection 53, and each second inclined portion 62 linearly extends between each second projection 52 and each fourth projection 54, the rigidity of the first inclined portions 61 and the second inclined portions 62 can be enhanced. Accordingly, it is possible to enhance conversion efficiency in the force direction in the load converting mechanism 110.

In the present embodiment, when the battery cells 21 expand, the fifth projections 55 and the sixth projections 56 come into contact with the battery cell 21A and the battery cell 21B, respectively.

According to this configuration, the number of contact points between the spacer 41 and the battery cells 21 becomes increased, thereby distributing the load applied from the spacer 41 to the battery cells 21. Accordingly, it is possible to suppress variation in internal resistance among the battery cells 21. In addition, it is possible to distribute the internal stress of the spacer 41 so as to increase an allowable stress and simplify the spacer 41 (use of lower-cost materials and reduction in thickness, etc.).

Specifically, in the present embodiment, the number of contact points between the spacer 41 and the battery cells 21 is increased at the timing when the amount of expansion of the battery cells 21 becomes increased, and thus the reaction force from the spacer 41 to the battery cells 21 becomes increased. After the fifth projections 55 and the sixth projections 56 come into contact with the battery cell 21A and the battery cell 21B, respectively, the spacer 41 becomes difficult to be further deformed, and thus it is possible to restrict an excessive expansion of the battery cells 21.

It is preferable to prevent the positions of the contact points between the battery cell 21A and the first projections 51 as well as the positions of the contact points between the battery cell 21B and the second projections 52 from varying due to the deformation of each spacer 41. In this case, predictivity of the deformation of the spacer 41 becomes increased, so that it becomes easier to control the positions of the contact points between the battery cells 21 and the spacer 41, thereby realizing a desired battery performance.

In the present embodiment, through the configuration of setting the contact area between each first projection 51 and the battery cell 21A to be greater than the contact area between each third projection 53 and the battery cell 21B, and of setting the contact area between each second projection 52 and the battery cell 21B to be greater than each contact area between each fourth projection 54 and the battery cell 21A, it becomes easier to obtain a phenomenon that the third projections 53 move in a direction toward the fourth projections 54 with the positions of the first projections 51 fixed, and the fourth projections 54 move in a direction toward the third projections 53 with the positions of the second projections 52 fixed.

The aforementioned structure of the battery pack 10 in the embodiment will be summarized as below. The battery pack 10 in the present embodiment includes: the battery cells 21A as first battery cells; the battery cells 21B stacked relative to the battery cells 21A as second battery cells; and the spacers 41 each of which has a wavy cross-sectional shape formed by repetitively alternating the projecting shapes projecting toward each battery cell 21A and the projecting shapes projecting toward each battery cell 21B, and is interposed between each battery cell 21A and each battery cell 21B. Each spacer 41 includes: the first projections 51 projecting toward each battery cell 21A and being in contact with the battery cell 21A; the second projections 52 disposed at positions apart from the first projections 51, projecting toward each battery cell 21B, and being in contact with the battery cell 21B; the third projections 53 each of which is adjacent to each first projection 51 among the multiple projecting shapes included in the spacer 41, is disposed between each first projection 51 and each second projection 52, projects toward the battery cell 21B, and is in contact with the battery cell 21B; the first inclined portions 61 each of which extends in an oblique direction relative to the stacking direction of the battery cell 21A and the battery cell 21B, and connects each first projection 51 and each third projection 53; the fourth projections 54 each of which is adjacent to each second projection 52 among the multiple projecting shapes included in the spacer 41, is disposed between each first projection 51 and each second projection 52, projects toward the battery cell 21A, and is in contact with the battery cell 21A; the second inclined portions 62 each of which extends in an oblique direction relative to the stacking direction of the battery cell 21A and the battery cell 21B, and connects each second projection 52 and each fourth projection 54; and the fifth projections 55 and the sixth projections 56 each of which is disposed between each third projection 53 and each fourth projection 54, and the fifth projections 55 and the sixth projections 56 project toward the battery cell 21A and the battery cell 21B, respectively, and are disposed out of contact with the battery cell 21A and the battery cell 21B. When the battery cell 21A and the battery cell 21B expand, the fifth projections 55 and the sixth projections 56 come into contact with the battery cell 21A and the battery cell 21B, respectively.

According to the above-configured battery pack 10 in the embodiment, it is possible to apply a predetermined load or more necessary to integrally bundle the multiple battery cells 21 from the spacer 41 to the battery cells 21, and also to realize reduction in load rate of the spacer 41. By realizing the reduction in load rate of the spacer 41, it is possible to attain reduction in dimension of the battery pack 10 in the standard-size bundling of the multiple battery cells 21. The bundling load of the battery cells 21 becomes reduced because of the reduction in load rate of each spacer 41, thereby simplifying components and manufacturing equipment required for bundling the multiple battery cells 21. Accordingly, it is possible to reduce the manufacturing cost for the battery pack 10.

In such a spacer 41, when the battery cells 21 expand, it is possible to increase the contact points between the spacer 41 and the battery cells 21, thereby distributing the load applied from the spacer 41 to the battery cells 21. Through this, it is possible to realize the battery pack 10 capable of securing an appropriate battery performance even when the battery cells 21 expand.

In the present embodiment, it has been described that the present invention is applied to a lithium ion battery, but the present invention is not limited to this, and may also be applicable to a nickel-hydrogen battery and a fuel cell battery.

It should be understood that the embodiment disclosed herein are exemplary and not restrictive in all aspects. It is intended that the scope of the present invention is defined by the claims and not by the above explanation, and includes equivalents of the claims and all modifications within the scope.

This invention is chiefly applied to a battery pack in which multiple battery cells are integrally bundled via spacers having flexibility that are interposed between stacked battery cells.

What is claimed is:

1. A battery pack comprising:
   a first battery cell;
   a second battery cell stacked relative to the first battery cell; and
   a spacer having a wavy cross-sectional shape configured of projecting shapes that project toward the first battery cell and the second battery cell alternately,
   the spacer being interposed between the first battery cell and the second battery cell,
   the spacer including:
   a first projection configured to project toward the first battery cell, the first projection being configured to be in contact with the first battery cell;
   a second projection being disposed at a position apart from the first projection, the second projection being configured to project toward the second battery cell, the second projection being configured to be in contact with the second battery cell;
   a third projection that is adjacent to the first projection among a plurality of the projecting shapes included in the spacer, the third projection being disposed between the first projection and the second projection, the third projection being configured to project toward the second battery cell, the third projection being configured to be in contact with the second battery cell;
   a first inclined portion configured to extend in an oblique direction relative to a stacking direction of the first battery cell and the second battery cell, the first inclined portion being configured to connect the first projection and the third projection;
   a fourth projection that is adjacent to the second projection among the plurality of the projecting shapes included in the spacer, the fourth projection being disposed between the first projection and the second projection, the fourth projection being configured to project toward the first battery cell, the fourth projection being configured to be in contact with the first battery cell;
   a second inclined portion configured to extend in an oblique direction relative to the stacking direction of the first battery cell and the second battery cell, the second inclined portion being configured to connect the second projection and the fourth projection;
   a fifth projection that is disposed between the third projection and the fourth projection, the fifth projection being configured to project toward the first battery cell, the fifth projection being configured to be disposed out of contact with the first battery cell; and
   a sixth projection that is disposed between the third projection and the fourth projection, the sixth projection being configured to project toward the second battery cell, the sixth projection being configured to be disposed out of contact with the second battery cell,
   the spacer being configured such that, when the first battery cell and the second battery cell expand, the fifth projection comes into contact with the first battery cell and the sixth projection comes into contact with the second battery cell, wherein
   a contact area between the first projection and the first battery cell is larger than a contact area between the third projection and the second battery cell, and a contact area between the second projection and the second battery cell is lager than a contact area between the fourth projection and the first battery cell.

2. The battery pack according to claim 1, wherein the first inclined portion linearly extends between the first projection and the third projection, and the second inclined portion linearly extends between the second projection and the fourth projection.

3. The battery pack according to claim 1, wherein the spacer includes a plurality of sets of the first projection, the second projection, the third projection, the fourth projection, the fifth projection, the sixth projection, the first inclined portion and the second inclined portion.

* * * * *